Nov. 27, 1928.
F. J. KERBER
BUMPERETTE
Filed Dec. 27, 1926
1,692,941
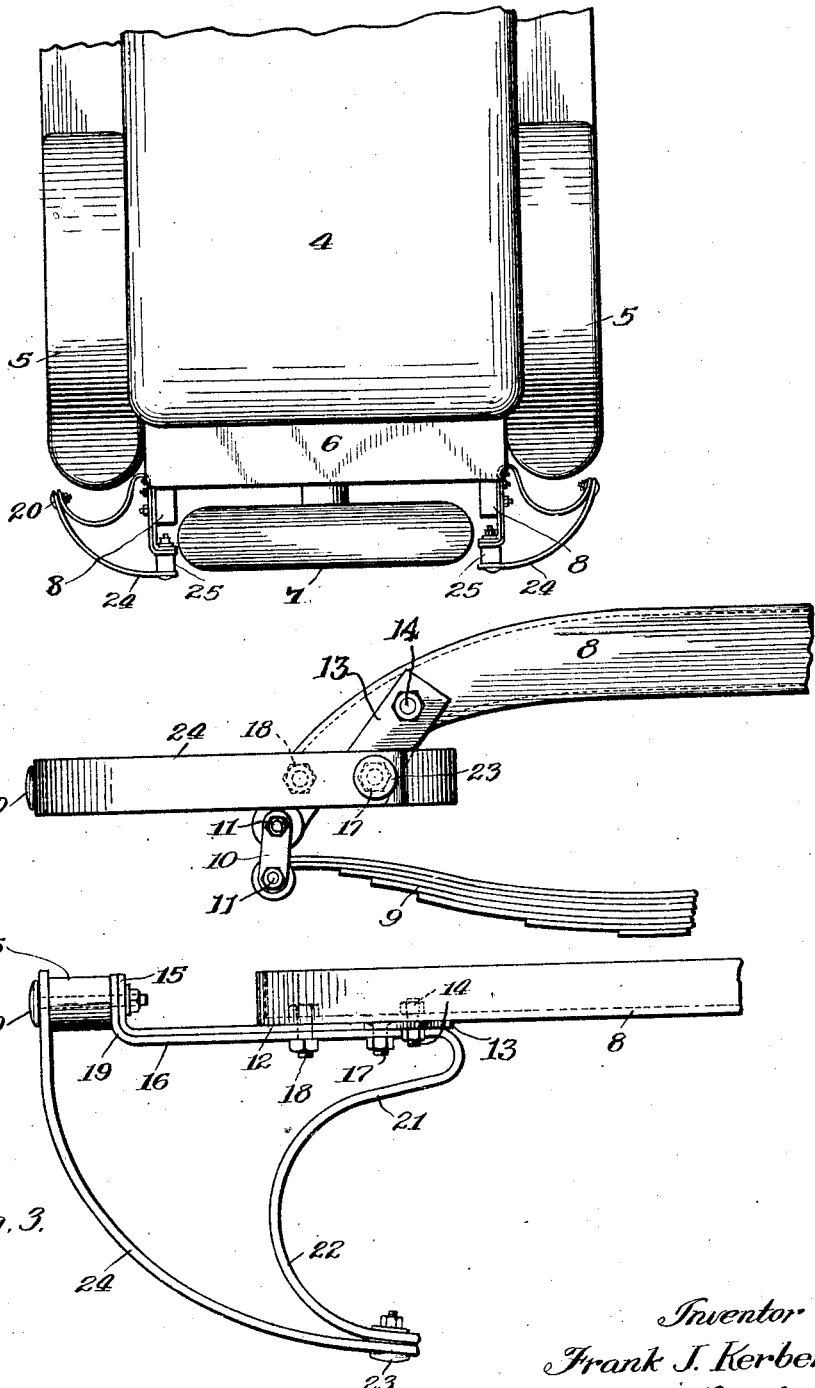
Inventor
Frank J. Kerber Patented Nov. 27, 1928.

1,692,941

UNITED STATES PATENT OFFICE.

FRANK J. KERBER, OF CHICAGO, ILLINOIS.

BUMPERETTE.

Application filed December 27, 1926. Serial No. 157,026.

My invention relates to bumpers for automobiles and more particularly to that type known as bumperettes, which are especially adapted for the rear of the automobile and adapted to leave or provide a space between the same for the accommodation of a tire rack and tire or tires, a trunk or the like, and at the same time effectively protect the rear fenders, wheels, body and spare tire or trunk and in general, the rear of the machine, from the impacts with other cars or objects as it is thought will be readily understood.

Among the objects of the invention are to provide a novel construction of bumper or bumperette, so-called, of the type referred to, which facilitates manufacture and can be produced economically, but which at the same time, is of a high class character and of the best materials; which embodies all of the best essentials of an impact member to take the impacts of other machines and at the same time provide the necessary resiliency to reduce the transmission of jar without injury thereto or to the car, while giving the required rigidity or strength to prevent injury or distortion to the bumperette; to provide added resiliency without impairing the ability of the devices to absorb shocks and to facilitate the mounting of the bumperettes on various types and styles of cars.

Other and further objects of the invention will be readily apparent as the description proceeds.

In the accompanying drawings:

Figure 1 is a plan view of the rear portion of an automobile with the bumperettes applied thereto, Figure 2 is a side elevation on an enlarged scale showing a bumperette applied to the rear portion of the side bar or member of a chassis, and Figure 3 is a plan view of the structure shown in Figure 2.

Referring to the drawings in detail, in which like reference characters designate like parts throughout the several views, 4 designates an automobile having the usual rear fenders 5, gasoline tank 6 and rear tire 7 supported in the usual or any preferred manner by a tire holder or rack, not shown, but which is common in the art, or there may be provided a trunk with or without the tire holder, in such a manner to project centrally from the rear of the car body and gasoline tank, thus rendering a bumper which extends across the entire back undesirable and unsightly as well as inconvenient so far as the mounting and removal of the spare tire is concerned.

The chassis is provided with the usual side members or bars 8 which curve downwardly at the rear and have the rear springs 9 connected thereto by the shackles 10 through the medium of the shackle bolts 11. All of the parts heretofore described may be of any well known or standard construction and no claim of novelty is made thereto. The bumperette particularly comprising my invention consists of a novel construction and arrangement of parts, and as shown, is made up of a spring metal flat bar 12 preferably steel, having its forward end directed or bent upwardly, or otherwise formed with an attaching portion 13 which is bolted to the side of the channel or side bar 8 of the chassis or frame as indicated at 14, simply by perforating the same or otherwise clamped thereto.

The rear end of the bar 12 is extended inwardly at substantially a right angle as shown at 15 above and in rear of the downwardly curved rear portion of the side member of the frame, preferably in slightly spaced relation thereto as shown, and in a horizontal position or substantially so. A similar bar 16 is placed alongside of the bar 12 and bolted thereto at two or more points and to the side member, as indicated at 17 and 18 and its rear end 19 placed against the end 15, both being apertured, as shown to receive a bolt 20. The portion 13 provides a substantial bearing for the device and attachment means therefor.

The forward end of the bar 16 is curved or extended outwardly for a considerable distance in rear or beyond the wheel fender in a substantialy reverse or ogee curve, first outwardly rearwardly as at 21 and then forwardly as at 22, with the free end extending at a slight outward angle or substantially parallel to the side of the chassis, as shown. This end is also apertured to receive a bolt or the like 23. A curved or outwardly convexed rear bar 24 is extended between the bolts 20 and 23, being punched or otherwise provided with an aperture for this purpose, at each end. The end which is engaged by the bolt or other connecting means 23 is bolted fast to the free end of the substantially S-shaped or ogee bar or spring member to which it is connected and which resiliently braces it, for the purpose of cushioning and absorbing the impacts from the rear and at the side.

In addition, there is interposed at the rear, a cushion member or sleeve 25, of rubber or other suitable material, said sleeve being positioned between the inner end of the bar 24 and the bent end 19 and the bolt 20 being passed through all of said parts so that an impact will cause the sleeve or resilient cushion member to be compressed and the bolt 20 freely slide through the parts 15 and 19 and give slightly to the impact, while at the same time absorbing it. The idea in providing the pair or plurality of bars 12 and 16, is to provide the necessary rigidity or stiffness to give strength to resist impact without bending or injuring the chassis and adjacent parts, and at the same time, to give greater resiliency than would be provided by a single bar of the combined thickness of the two bars 12 and 16, in addition to facilitating manufacture economically with lighter material and the attachment of the device to the frame of the machine in an efficient and substantially rigid manner, as provided by the upwardly extending portion 13. However, it is to be understood that the attachment may be made in any desirable and effective manner which will give the necessary results, and therefore I do not desire to be restricted to the exact construction and arrangement disclosed.

Moreover, while I have shown the invention in the preferred form, it is to be understood that various modifications may be made in the construction without departing from the principles and spirit of the invention so long as the same are within the scope of the device as claimed hereinafter.

Having thus described my invention, what I claim is:

1. A bumperette including a bar having its forward end angularly bent upwardly for attachment to the side bar of an automobile frame and having a resilient member extending outwardly from the forward end thereof, another member extending from the free end of the resilient member to a point in rear of the first bar, and a connection at the latter point with an interposed resilient member.

2. A bumperette including a bar for attachment to the side bar of an automobile frame and having a spring member extending outwardly from the inner end thereof, a curved member attached to the free end of the spring member and extending rearwardly and inwardly, and a resilient connection between the curved member and the adjacent end at the outer part of the first bar.

3. A bumperette comprising a bar for attachment to the side of an automobile chassis and having an outwardly extending curved spring member at its forward end, an inwardly and rearwardly curved bar extending from the outer portion of the spring member and connected thereto, and a cushion member between the rear end of the first bar and the inner end of the curved bar.

4. A bumperette for mounting at the rear end of the side bar of an automobile frame, including a sectional bar anchored to the side bar and having an angular rear end, a curved member extending outwardly from the forward end thereof, a bar connected to the outer end of the last bar and extending in spaced relation to the angular end, a connection between the latter ends, and a resilient cushion between said ends adapted to be compressed therebetween.

5. A bumperette comprising a plurality of bars in contact and adapted to attach to a chassis, both having inwardly bent rear ends, one bar having at its forward end an outwardly extending portion with a compound curve, a curved bar connected to the outer end of the latter bar, and a compensating connection between the curved bar and the inwardly bent rear ends.

In testimony whereof I affix my signature.

FRANK J. KERBER.